United States Patent [19]

Someno

[11] Patent Number: 5,751,487

[45] Date of Patent: May 12, 1998

[54] MULTILAYERED FILTER FILMS AND METHOD FOR MAKING THE SAME

[75] Inventor: Yoshihiro Someno, Miyagi-ken, Japan

[73] Assignee: Alps Electric Co., Ltd., Tokyo, Japan

[21] Appl. No.: 685,014

[22] Filed: Jul. 22, 1996

[30] Foreign Application Priority Data

Aug. 28, 1995 [JP] Japan .................................. 7-218917

[51] Int. Cl.[6] .............................. G02B 5/28; B05D 5/06
[52] U.S. Cl. ........................ 359/589; 359/582; 427/270; 427/271; 427/162
[58] Field of Search ..................... 359/582, 585–590, 359/390, 891; 427/270, 271, 162; 349/105

[56] References Cited

U.S. PATENT DOCUMENTS

| | | | |
|---|---|---|---|
| 4,029,394 | 6/1977 | Araki | 359/587 |
| 4,373,775 | 2/1983 | Gasparian | 385/47 |
| 4,793,692 | 12/1988 | Kamio et al. | 349/106 |
| 5,058,997 | 10/1991 | Dickerson et al. | 349/105 |
| 5,241,417 | 8/1993 | Sekiguchi | 359/586 |
| 5,281,450 | 1/1994 | Yaniv | 427/270 |
| 5,558,927 | 9/1996 | Aruga et al. | 359/589 |

*Primary Examiner*—Jon W. Henry
*Attorney, Agent, or Firm*—Guy W. Shoup

[57] ABSTRACT

The present invention relates to multilayered filter films, and in particular, a multilayered filter film not having a substrate and a method for making the same. The method for making the multilayered filter film not having a substrate includes a step for forming a filter frame layer having a window on the substrate, a step for forming a multilayered film on the substrate inside the window and on the filter frame layer, and a step for removing the substrate from the filter frame layer and the multilayered film.

6 Claims, 5 Drawing Sheets

FIG. IA
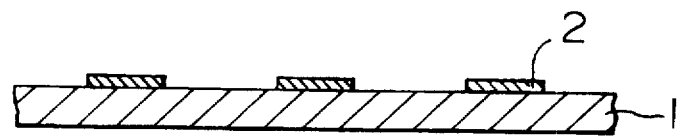
FIG. IB
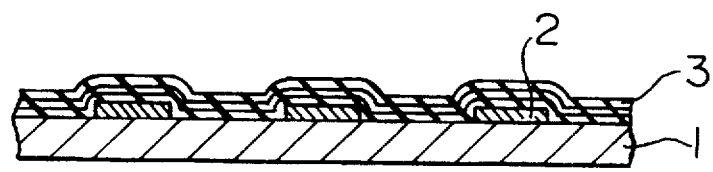
FIG. IC
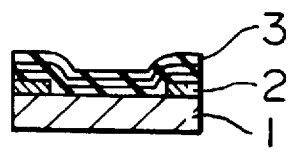
FIG. ID
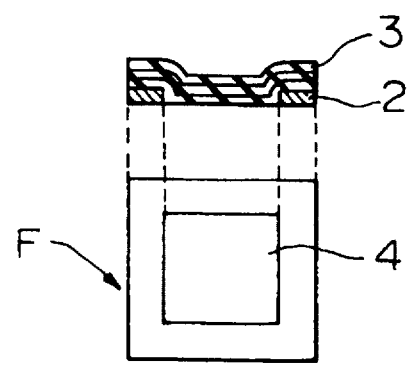

MULTILAYERED FILTER FILMS AND METHOD FOR MAKING THE SAME

BACKGROUND OF THE INVENTION

1. Field of the Invention

The present invention relates multilayered filter films having wavelength selectivity and methods of making the same. In particular, the present invention relates to a multilayered filter film not having a substrate, in other words, in which the substrate for forming the multilayered film is removed, and a method for making the same.

2. Description of the Related Art

In general, multilayered filter films are produced by forming multilayered films on transparent substrates, e.g. glass substrate. However, since the optical path length increases as much as the substrate thickness in such multilayered filter films having substrates, a collecting lens is required to collect the diffused light when the multilayered filter film is provided between optical fibers as a wave combining or dividing filter, or between a laser diode and a photodiode.

A multilayered filter film not having a substrate is proposed in Japanese Laid-Open Patent No. 4-7505 in which the substrate is removed after a multilayer is formed on the substrate. In accordance with such a multilayered filter film not having a substrate, the small size in devices can be achieved corresponding to the substrate volume. Further, the collecting lens can be omitted because of the decreased thickness when the multilayered filter films are provided between optical fibers as a wave combining or dividing filter, or between a laser diode and a photodiode.

Since the multilayered filter film not having the substrate set forth above consists of only the multiple deposited films, some deformations, such as curling, occur due to the internal strain and the difference of the thermal expansion coefficient between layers, so desired optical characteristics can not be achieved. Therefore, when such a multilayered filter film is placed between optical fibers or between a laser diode and a photodiode as a wave combining or dividing filter, the tip of the optical fiber or a glass may be contacted to both surfaces of the multilayered film. However, it is remarkably difficult to handle the multilayered film since the film has a thickness of approximately 5 to 10 μm.

SUMMARY OF THE INVENTION

It is an object of the present invention to solve the above-mentioned drawbacks, and in particular to provide a multilayered filter film not having a substrate and a method for producing the same, which has desired optical characteristics due to no deformation, such as curling, and is easy to handle.

A method for making a multilayered filter film in accordance with the present invention includes a step for forming a filter frame layer having a window on a substrate, a step for forming a multilayered film on the substrate inside the window and on the filter frame layer, and a step for removing the substrate from the filter frame layer and the multilayered film.

Further, a method for making a multilayered filter film in accordance with the present invention includes a step for forming grooves for cutting into a plurality of filter chips on a single crystal Si substrate in the cleavage direction; a step for forming a filter frame layer having a window on the substrate along the groove; a step for forming a multilayered film on the substrate inside the window and on the filter frame layer; a step for cutting the substrate along the groove on which the filter frame and the multilayered film is formed; and a step for removing the substrate from the filter frame layer and the multilayered film.

Moreover, a method for making a multilayered filter film in accordance with the present invention includes a step for forming a filter frame layer having a window on a substrate; a step for forming a first protective layer for protecting a multilayered film on the substrate inside the window and on the filter frame layer; a step for forming the multilayered film on the protective layer so that it will not stick out of the protective layer; a step for forming a second protective layer on the multilayered film so that it will stick out of the multilayered film; and a step for removing the substrate while cutting into a plurality of chips at the position which the multilayered film sticks out.

In the methods set forth above, a groove is formed along the frame on the filter frame layer, and the multilayered film is formed on the groove.

In addition, in a multilayered filter film in accordance with the present invention, a multilayered film is formed on a filter frame layer having a window, and inside the window so that the lower surfaces of the multilayered film and the filter frame layer are formed on the same plane.

Further, in the multilayered filter film in accordance with the present invention, a protective layer is provided so as to cover the upper, lower and side surfaces of the multilayered film.

Moreover, a groove is formed along the frame on the filter frame layer, and the multilayered film is formed on the groove.

BRIEF DESCRIPTION OF THE DRAWINGS

FIGS. 1A, 1B, 1C and 1D are illustrative cross-sectional views of a process for producing a multilayered filter film not having a substrate in accordance with the first embodiment of the present invention;

DESCRIPTION OF THE PREFERRED EMBODIMENTS

Figure 2:
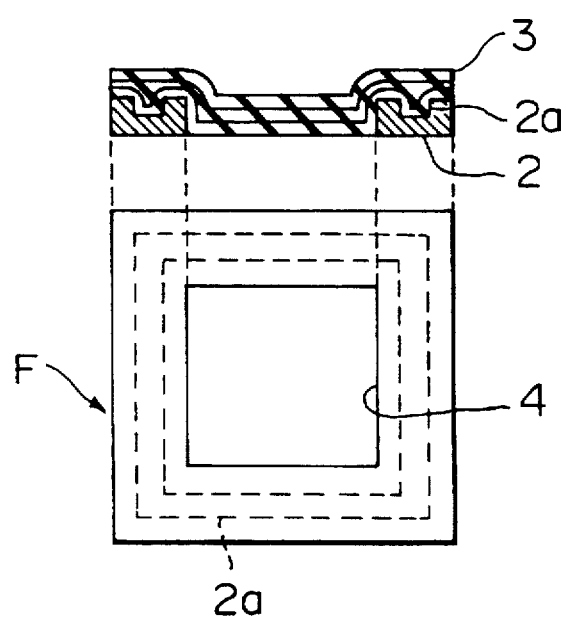
FIG. 2 is a cross-section and planer views illustrating another embodiment of the frame layer in FIG. 1.

Embodiments in accordance with the present invention will be explained in reference to figures.

FIGS. 1A, 1B, 1C and 1D are illustrative cross-section views of a process for producing a multilayered filter film not having a substrate in accordance with the first embodiment of the present invention. In the process shown in FIG. 1, a filter chip F having a rectangular filter window 4 is produced as shown in FIG. 1D. A substrate 1 is used as a base in the process and will be removed later. The substrate 1 is composed of Si, a metal, or the like, and has a thickness of 1,500 μm, for example.

As shown in FIG. 1A, a frame layer 2 is deposited on the substrate 1 to held a multilayered filter film by ion beam sputtering to a thickness of 5 to 10 µm, for example. Materials for the frame layer 2 are selected from those having almost the same thermal expansion coefficient as the substrate 1 so that the internal strain can be minimized and thus the multiple layers are not deformed. For example, $Si_3N_4$ may be used for the Si substrate, or Al may be used for a metal substrate.

Then, a multilayered film 3 having a desired wave selectivity, such as $TiO_2$ or $SiO_2$ is deposited on the substrate 1 and the frame layer 2 as shown in FIG. 1B. Since the multilayered film 3 inside the window 4 of the filter is formed on the substrate 1, the lower surfaces of the frame layer 2 and the multiple layer 3 are formed on the same plane. After the multilayered film 3 is cut into chips as shown in FIG. 1C, the substrate is removed as shown in FIG. 1D. In such a way, filter chips each having the frame with the filter window 4 are produced. The step for cutting the substrate FIG. 1C and the step for removing the substrate in FIG. 1D are exchangeable each other.

Since the multilayered film 3 of the filter chip F is held by the frame layer 2 at its periphery, and the widow 4 surrounded by the frame layer 2 acts as the filter section having a wave selectivity, the multilayered film can be prevented from any deformation such as curling and has desired optical characteristics. The shape of the window 4 is not limited to rectangular, but may be circular, for example. A groove 2a may be provided in the center of the frame layer 2 in order to increase the strength between the frame layer 2 and the multilayered film 3 as shown in FIG. 2.

Figure 3A:
FIGS. 3A, 3B, 3C, 3D and 3E are illustrative cross-section views of a process for producing a multilayered filter film not having a substrate in accordance with the second embodiment of the present invention.
Figure 3B:
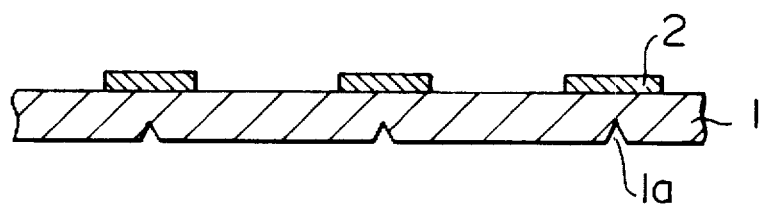
Figure 3C:
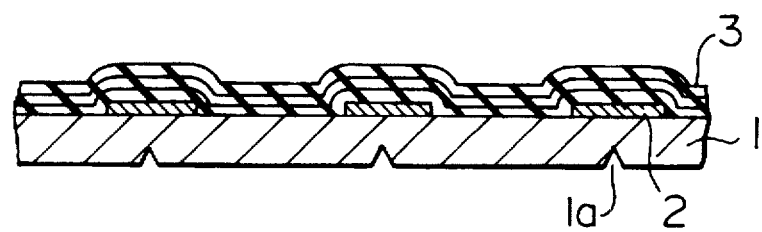
Figure 3D:
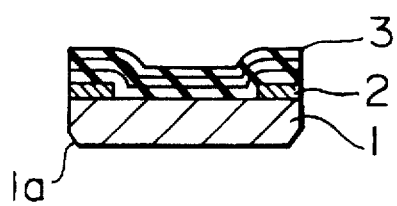
Figure 3E:

FIGS. 3A, 3B, 3C, 3D and 3E are illustrative cross-section views of a process for producing a multilayered filter film not having a substrate in accordance with the second embodiment of the present invention. In the second embodiment, single crystal Si is used as the substrate 1. V-shape grooves 1a are formed on the lower surface of the single crystal Si substrate 1 along its cleavage direction to cut into chips as shown in FIG. 3A. Then, frame layers 2 having windows 4 are formed on the substrate 1 along the V-shape grooves 1a as shown in FIG. 3B, and a multilayered film 3, such as $TiO_2$, or $SiO_2$, having a desired wave selectivity, is deposited on the substrate 1 and the frame layer 2 as shown in FIG. 3C. After the multilayered film with the substrate is cut into chips along the V-shaped grooves 1a as shown in FIG. 3D, each chip with the substrate is dipped into a hydrofluoric acid solution to dissolve the substrate 1. In such a way, the filter chip F having the frame with the filter window 4 is produced by removing the substrate.

FIGS. 4A, 4B, 4C and 4D are illustrative cross-section views of a process for producing a multilayered filter film not having a substrate in accordance with the third embodiment of the present invention. Materials, such as $TiO_2$ and $SiO_2$, readily undergo in their compositions by external water, resulting in the changes of their wave selectivity. Therefore, when such filters are used for a light amplifier in which the transmitted light is amplified by pumping light, the amplification cannot be carried out appropriately. In the third embodiment, transparent, dense protective films 5a and 5b stable to humidity, e.g. MgF2, AlN, AlON, SiAlON, and SiON films are deposited on the upper and lower surfaces of the multilayered film 3 with a planer method to prevent the penetration of external water.

Figure 4A:
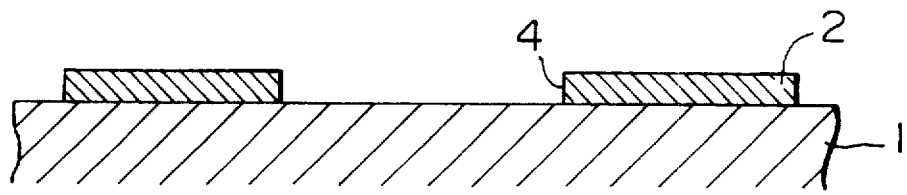
FIGS. 4A, 4B, 4C and 4D are illustrative cross-section views of a process for producing a multilayered filter film not having a substrate in accordance with the third embodiment of the present invention.
Figure 4B:
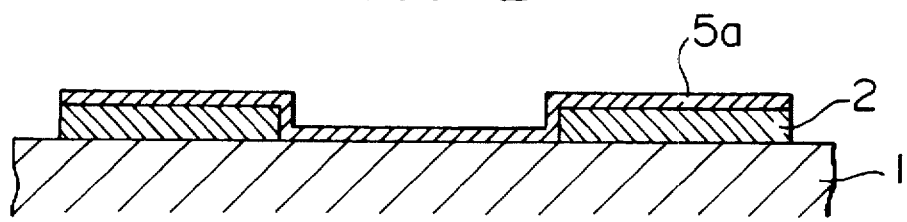
Figure 4C:
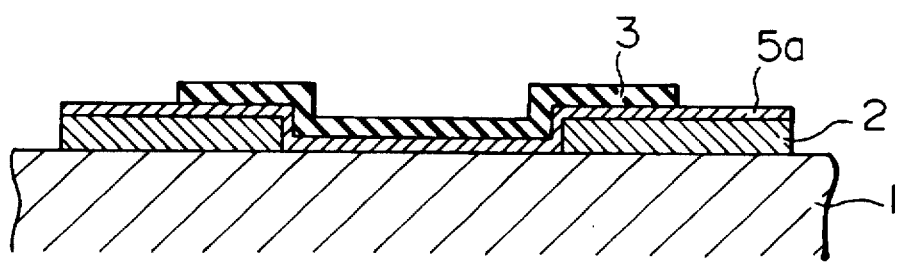

After a frame layer 2 having a window 4 is formed on the substrate 1 as shown in FIG. 4A, a first protective film 5a is formed so as to cover entirely the substrate 1 and the frame layer 2 as shown in FIG. 4B. Then, a multilayered film 3 is formed on the entire first protective film 5a, and unnecessary multilayered film 3 is removed by etching so that the region corresponding to the window 4 and a part of its periphery are covered and its outer section is not covered. In such a way, the first protective film 5a is formed so that the multilayered film 3 will stick out as shown in FIG. 4C.

Figure 4D:
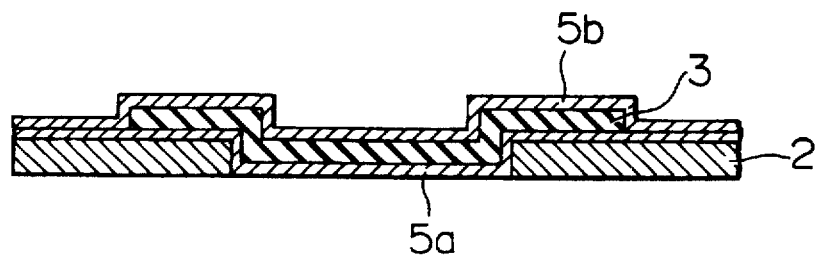

After a second protective film 5b is formed on the multilayered film 3 and its peripheral first protective film 5a as shown in FIG. 4D, the substrate is removed and the multilayered film is cut into chips at the position at which the protective film sticks out of the multilayered film. As the result, the filter chips F, of which the upper, lower and side surfaces of each multilayered film 3 are entirely covered with the second protective film 5b, are produced.

Figure 5:
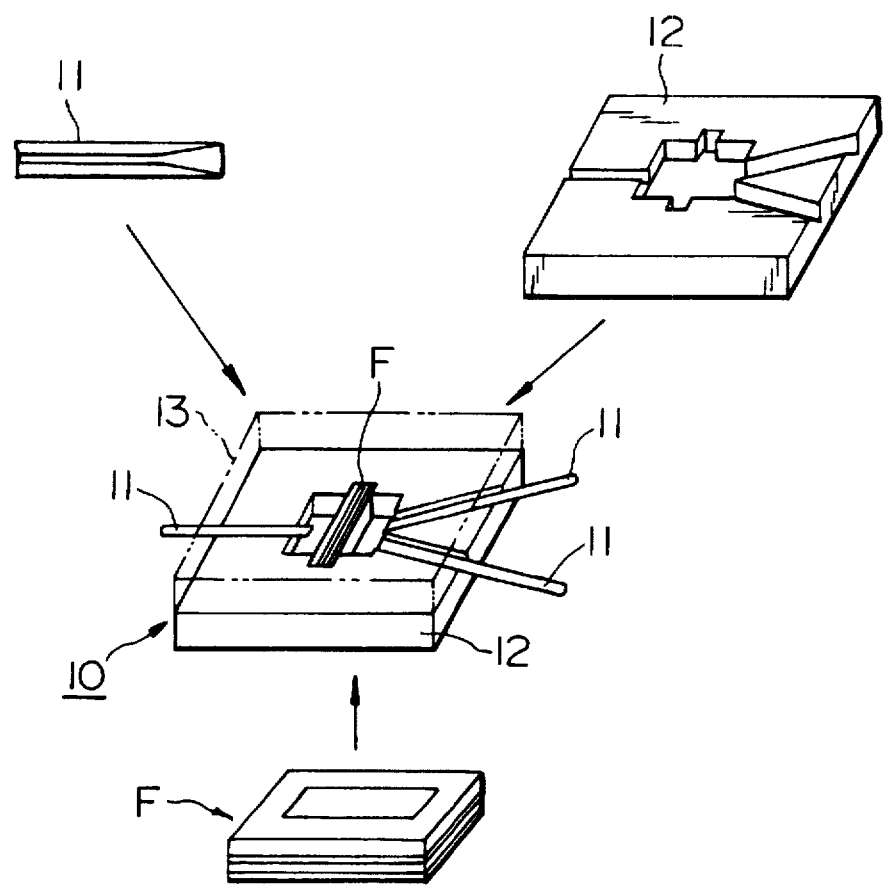
FIG. 5 is an illustrative view of an optical wave dividing unit to which the multilayered filter film in accordance with the present invention is applied.

FIG. 5 is an illustrative view of an optical wave dividing unit 10 to which the multilayered filter film set forth above is applied. The optical wave dividing unit 10 comprises the above-mentioned filter chip F having the frame, optical fibers 11 processed so that the diffused light decreases at their tips, a Si substrate 12 with a guide which is shaped by machining or etching to guide the filter chip F and optical fibers 11, and a cover 13 to cover the substrate 12. The filter chip F is fixed to the frame layer 2 by laser welding. The position of the filter chip F can be readily adjusted by using the surface of the frame layer 2 which is present in the same plane with the multilayered film 3.

Such a thin light dividing unit 10 having the structure set forth above enable the distance between optical fibers 11 to decrease when the filter chip F is positioned between fibers 11, so a collecting lens can be omitted. Further, since the filter chip has a frame, deformation including curling can be prevented and thus a desired wave dividing characteristics can be achieved.

What is claimed is:

1. A method for making a multilayered filter film comprising: a step for forming a filter frame layer having a window on a substrate; a step for forming a multilayered film on the substrate inside said window and on the filter frame layer; and a step for removing said substrate from said filter frame layer and said multilayered film.

2. A method for making a multilayered filter film in accordance with claim 1, wherein a groove is formed along the frame on said filter frame layer, and said multilayered film is formed on the groove.

3. A method for making a multilayered filter film comprising: a step for forming grooves for cutting into a plurality of filter chips on a single crystal Si substrate in the cleavage direction; a step for forming a filter frame layer having a window on the substrate along said groove; a step for forming a multilayered film on the substrate inside said window and on said filter frame layer; a step for cutting the substrate along said groove on which said filter frame and said multilayered film are formed; and a step for removing said substrate from said filter frame layer and said multilayered film.

4. A method for making a multilayered filter film in accordance with claim 3, wherein a groove is formed along the frame on said filter frame layer, and said multilayered film is formed on the groove.

5. A method for making a multilayered filter film comprising: a step for forming a filter frame layer having a window on a substrate; a step for forming a first protective layer for protecting a multilayered film on the substrate inside said window and on said filter frame layer; a step for forming the multilayered film on said protective layer so that it will not stick out of said protective layer; a step for forming a second protective layer on said multilayered film so that it will stick out of the multilayered film; and a step for removing said substrate while cutting into a plurality of chips at the position which said multilayered film sticks out.

6. A method for making a multilayered filter film in accordance with claim 5, wherein a groove is formed along the frame on said filter frame layer, and said multilayered film is formed on the groove.

* * * * *